(12) United States Patent
Suzuki et al.

(10) Patent No.: US 9,354,793 B2
(45) Date of Patent: May 31, 2016

(54) CLOUD COMPUTING SYSTEM AND APPLICATION PROVISION METHOD

(75) Inventors: Tatsuya Suzuki, Tokyo (JP); Hiromasa Ohkubo, Kanagawa (JP); Eiji Yamada, Tokyo (JP); Kensaku Sanda, Kanagawa (JP); Ryota Akao, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 150 days.

(21) Appl. No.: 14/240,977

(22) PCT Filed: Apr. 17, 2012

(86) PCT No.: PCT/JP2012/002643
§ 371 (c)(1),
(2), (4) Date: Feb. 25, 2014

(87) PCT Pub. No.: WO2013/035217
PCT Pub. Date: Mar. 14, 2013

(65) Prior Publication Data
US 2014/0181675 A1    Jun. 26, 2014

(30) Foreign Application Priority Data

Sep. 6, 2011  (JP) ................................. 2011-194141

(51) Int. Cl.
*G06F 3/00* (2006.01)
*G06F 3/0484* (2013.01)
(Continued)

(52) U.S. Cl.
CPC ............ *G06F 3/04842* (2013.01); *A63F 13/02* (2013.01); *G06F 9/4443* (2013.01); *G06F 9/5072* (2013.01)

(58) Field of Classification Search
CPC ..... G06F 3/048; G06F 3/04842; G06F 9/4443; A63F 13/02
USPC ........................................................ 715/733
See application file for complete search history.

(56) References Cited

U.S. PATENT DOCUMENTS

| 8,219,071 | B2 | 7/2012 | Kokubo | |
| 2003/0037107 | A1* | 2/2003 | Maeda | G06F 8/61 709/203 |

(Continued)

FOREIGN PATENT DOCUMENTS

| JP | 2006313486 A | 11/2006 |
| JP | 2009003584 A | 1/2009 |

(Continued)

OTHER PUBLICATIONS

International Preliminary Report on Patentability and Written Opinion for Corresponding PCT Application No. PCT/JP2012/002643, dated Mar. 20, 2014.

(Continued)

*Primary Examiner* — Angie Badawi
(74) *Attorney, Agent, or Firm* — Matthew B. Dernier, Esq

(57) ABSTRACT

In a cloud computing system having a plurality of computational resources that are connected via a network, a table display section displays, on a terminal used by a user using the cloud computing system, a table showing a list of thumbnail movies of execution screens of applications that can be provided on arbitrary dates and times to the user, the table assigning the thumbnail movies to specified dates and times. A movie selection acceptance section acquires the user's selection from the thumbnail movies shown in the table. An application provision part provides an application, associated with the thumbnail movie selected by the user, to the user.

16 Claims, 11 Drawing Sheets

(51) Int. Cl.
*G06F 9/44* (2006.01)
*G06F 9/50* (2006.01)
*A63F 13/98* (2014.01)

(56) References Cited

U.S. PATENT DOCUMENTS

| | | | |
|---|---|---|---|
| 2006/0271618 A1 | 11/2006 | Kokubo | |
| 2009/0052864 A1 | 2/2009 | Oide | |
| 2009/0111576 A1* | 4/2009 | Ostergren | A63F 13/12 463/29 |
| 2009/0125842 A1* | 5/2009 | Nakayama | G06F 3/0482 715/835 |
| 2009/0325711 A1* | 12/2009 | Bronstein | A63F 13/10 463/42 |
| 2010/0313166 A1 | 12/2010 | Nakayama | |
| 2011/0283304 A1* | 11/2011 | Roberts | H04H 60/46 725/9 |

FOREIGN PATENT DOCUMENTS

| | | |
|---|---|---|
| JP | 2009055095 A | 3/2009 |
| JP | 2010057921 A | 3/2010 |
| WO | 2007125648 A1 | 11/2007 |

OTHER PUBLICATIONS

International Search Report for Corresponding PCT Application No. PCT/JP2012/002643, dated Jul. 24, 2012.

\* cited by examiner

FIG. 3

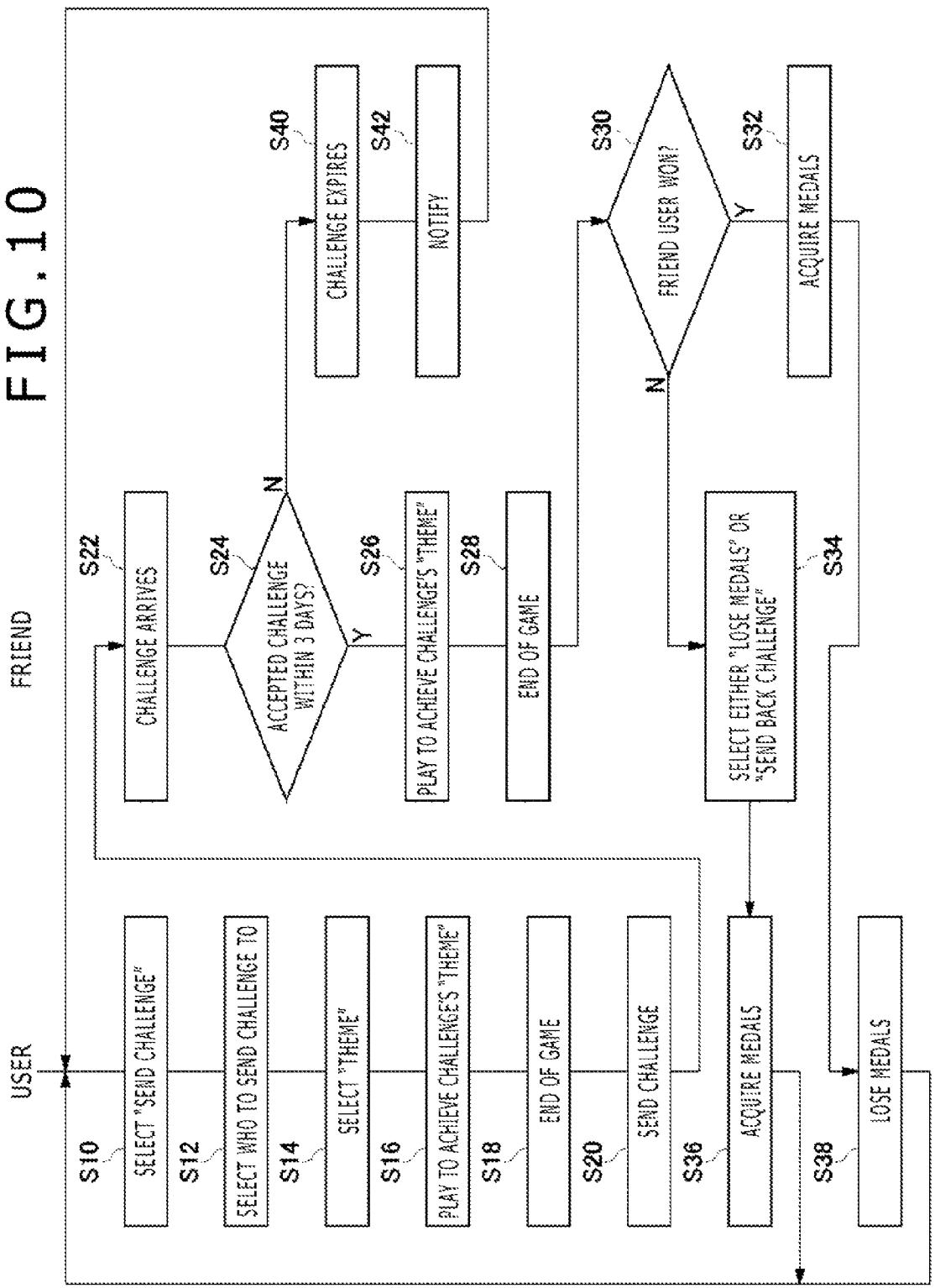

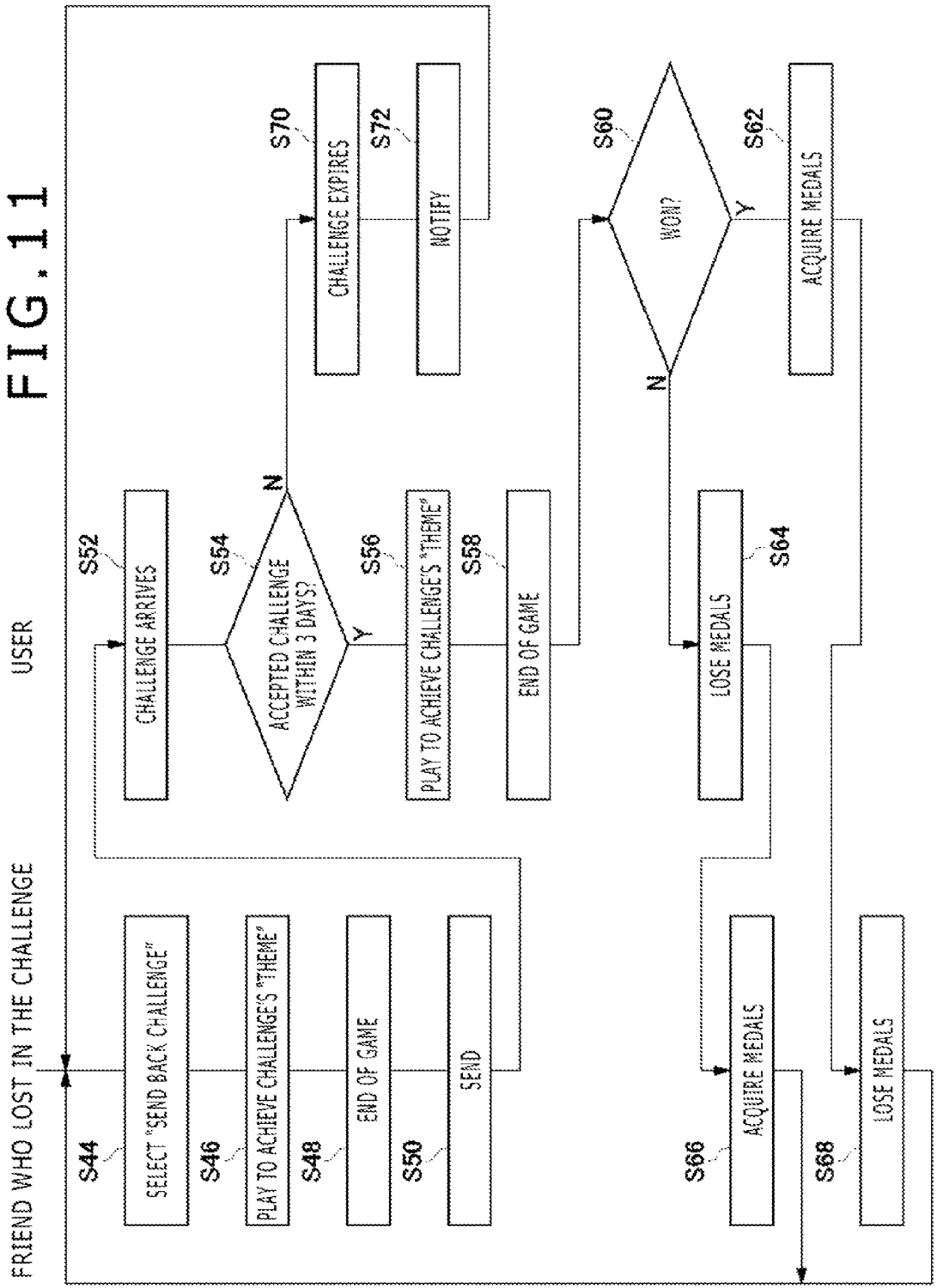

CLOUD COMPUTING SYSTEM AND APPLICATION PROVISION METHOD

TECHNICAL FIELD

The present invention relates to a cloud computing system and an application provision method using the same.

BACKGROUND ART

Recent years have witnessed rapid development of network communication technologies including the Internet, with so-called cloud services, services that provide users with various applications by way of networks, becoming increasingly available. Using cloud services makes it possible for a user to use applications without possessing the applications.

On the other hand, computer technologies have made significant progress recently. For example, applications that are high in computational cost such as games required a dedicated piece of hardware for execution in the past. In recent years, however, so-called game emulators, pieces of software that execute game applications by imitating their hardware, have become increasingly practical.

SUMMARY

Technical Problem

The inventor of the present invention has recognized the potential of promoting communications between numerous users through applications by providing a huge number of applications that were developed in the past for use on dedicated hardware using computational resources of a cloud computing system to which a plurality of users can simultaneously connect.

The present invention has been devised in light of the foregoing, and it is an object of the invention to provide a technology for promoting communications between users through applications provided by a cloud computing system.

Solution to Problem

In order to solve the above problem, a mode of the present invention is a cloud computing system having a plurality of computational resources that are connected via a network. The cloud computing system includes a table display section, a movie selection acceptance section, and an application provision part. The table display section displays a table on a terminal used by a user using the cloud computing system. The table shows a list of thumbnail movies of execution screens of applications that can be provided on arbitrary dates and times to the user. The table assigns the thumbnail movies to specified dates and times. The movie selection acceptance section acquires the user's selection from the thumbnail movies shown in the table. The application provision part provides an application, associated with the thumbnail movie selected by the user, to the user.

Another mode of the present invention is an application provision method in a cloud computing system having a plurality of computational resources that are connected via a network. This method causes the computational resources of the cloud computing system to perform a step of displaying a table on a terminal used by a user using the cloud computing system. The table shows a list of thumbnail movies of execution screens of applications that can be executed on arbitrary dates and times by the user. The table assigns the thumbnail movies to specified dates and times. The method further causes the computational resources to perform a step of acquiring the user's selection from the thumbnail movies. The method further causes the computational resources to perform a step of providing an application, associated with the thumbnail movie, to the user who selected the thumbnail movie.

Still another mode of the present invention is an application provision server that provides a game application to a plurality of users via a network. This application server includes an acceptance part, an application provision part, and an achievement level acquisition part. The acceptance part accepts, from a first user using a client connected to the application provision server, a selection of a game application, a goal to be achieved in the game application, and a specification of a second user who will be the opponent in the game application. The application provision part provides, to the first user, the game application specified by the first user. The achievement level acquisition part acquires, from the first user, an achievement level against the goal after the game application is ended by the first user. Here, the application provision part provides, to the second user together with the goal, the game application provided to the first user after the game application is ended by the first user. The achievement level acquisition part acquires, from the second user, a second user's achievement level against the goal after the game application is ended by the second user. Further, the application provision server further includes a notification part. The notification part compares the achievement levels of the first and second users acquired by the achievement level acquisition part, notifying the first and second users which of the two users is higher in achievement level.

Still another mode of the present invention is an application provision method in a client-server type system that provides a game application to a plurality of users via a network. This application provision method causes a computational resource of an application provision server to perform a step of providing, to a first user using a client terminal connected to the application provision server, a game application selected by the first user. The application provision method further causes the computational resource to perform a step of providing, to a second user specified by the first user, the game application provided to the first user after the game application is ended by the first user. The application provision method still further causes the computational resource to perform a step of notifying achievement levels of the first and second users to the client terminals of the first and second users after the game application is ended by the second user.

Still another mode of the present invention is a client terminal that is connected to a server providing a game application via a network and to which an application is provided by the server. This client terminal includes an indication part and a display part. The indication part indicates, to the server, a selection of a game application, a goal to be achieved in the game application, and a specification of a user who will be the opponent in the game application. The display part displays an execution screen of the specified game application. Here, the display part further displays two achievement levels. One of them is an achievement level of the user specified as the opponent against the goal acquired from the server after the game application is ended by that user. The other is an achievement level of a user using the present client terminal against the goal.

Still another mode of the present invention is a client-server type system that provides a game application to a plurality of users via a network. In this system, a client terminal connected to the system includes an indication part, a display part, and an achievement level transmission part. The indication part indicates, to a server, a selection of a game application, a goal to be achieved in the game application, and a specification of a user who will be the opponent in the game application. The display part displays an execution screen of the specified game application. The achievement level transmission part transmits an achievement level against the goal to the application provision server after the game application is ended. The server of the system includes an acceptance part, an application provision part, and an achievement level acquisition part. The acceptance part accepts, from a first user using the client terminal, the selection of the game application, the goal to be achieved in the game application, and the specification of a second user who will be the opponent in the game application. The application provision part provides, to the client terminal used by the first user, the game application specified by the first user. The achievement level acquisition part acquires, from the first user, the achievement level against the goal after the game application is ended by the first user. Here, the application provision part provides, to the second user, the game application provided to the first user together with the goal after the game application is ended by the first user. The achievement level acquisition part acquires, from the second user, a second user's achievement level against the goal after the game application is ended by the second user. Moreover, the present system further includes, in at least either the client terminal or the server, a comparison part that compares the achievement levels of the first and second users. The display part further displays the result of comparison made by the comparison part.

Still another mode of the present invention is a game application provision method in a system that includes at least two client terminals, first and second client terminals, and a server. The first client terminal is used by a first user. The second client terminal is used by a second user. The server is connected to the client terminals via a network. This method includes an acceptance step, a first application provision step, a first achievement level acquisition step, a second application provision step, a second achievement level acquisition step, and a display step. The acceptance step accepts, from the first user via the first client terminal, a selection of a game application, a goal to be achieved in the game application, and a specification of the second user who will be the opponent in the game application. The first application provision step provides, to the first client terminal, the game application specified by the first user. The first achievement level acquisition step acquires, from the first client terminal, an achievement level against the goal after the game application is ended by the first user. The second application provision step provides, to the second user, the game application provided to the first user together with the goal after the game application is ended by the first user. The second achievement level acquisition step acquires, from the second client terminal, a second user's achievement level against the goal after the game application is ended by the second user. The display step displays a comparison result of the achievement levels of the first and second users. Here, a processor of the server performs the acceptance step, and the first and second achievement level acquisition steps. Respective processors of the first and second client terminals perform the display step. The first application provision step is performed by at least either the processor of the first client terminal or the processor of the server. The second application provision step is performed by at least either the processor of the second client terminal or the processor of the server.

It should be noted that any combinations of the above components and any conversions of expressions of the present invention between "method," "device," "system," "computer program," "data structure," "recording media" and so on are also effective as modes of the present invention.

Advantageous Effect of Invention

The present invention provides a technology for promoting communications between users through applications provided by a cloud computing system.

BRIEF DESCRIPTION OF DRAWINGS

FIG. 3 is a diagram illustrating an example of an application selection screen according to embodiment 1.

FIG. 10 is a first half of a flowchart illustrating a flow of processing a challenge according to embodiment 2.

FIG. 11 is a second half of the flowchart illustrating the flow of processing a challenge according to embodiment 2.

DESCRIPTION OF EMBODIMENTS

[Embodiment 1]

Embodiment 1 will be outlined. A cloud computing system 100 according to embodiment 1 intentionally selects a small number of applications from among a plurality of applications that can be executed by a user at arbitrary times, presenting these applications to the user. Matching between users through applications is promoted by drawing the attention of many users to a small number of specific applications.

Figure 1:
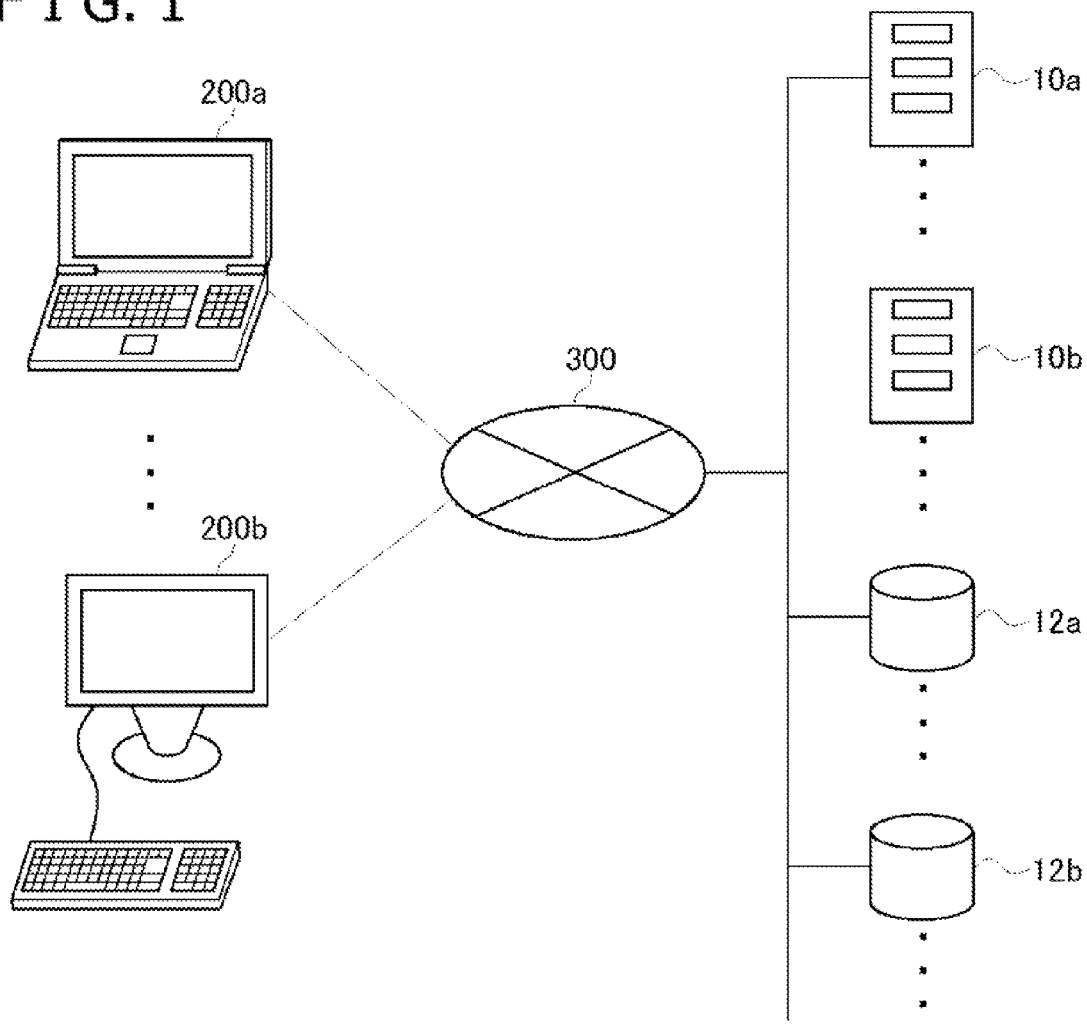
FIG. 1 is a diagram describing an outline of a cloud computing system.

FIG. 1 is a diagram describing an outline of the cloud computing system 100. FIG. 1 shows, of a plurality of client terminals 200 that are collectively called as such, client terminals 200a and 200b. The client terminals 200 are connected to a plurality of servers 10 and databases 12 via a network 300 such as the Internet. FIG. 1 shows, of the plurality of servers 10, servers 10a and 10b. Further, FIG. 1 shows, of the plurality of databases 12, databases 12a and 12b.

FIG. 1 illustrates a manner in which the client terminals 200, the servers 10, and other devices are connected via the network 300, schematically showing a practical system configuration. However, users using the client terminals 200 do not often become aware of the system configuration such as the network 300, the servers 10, and the databases 12.

Figure 2:
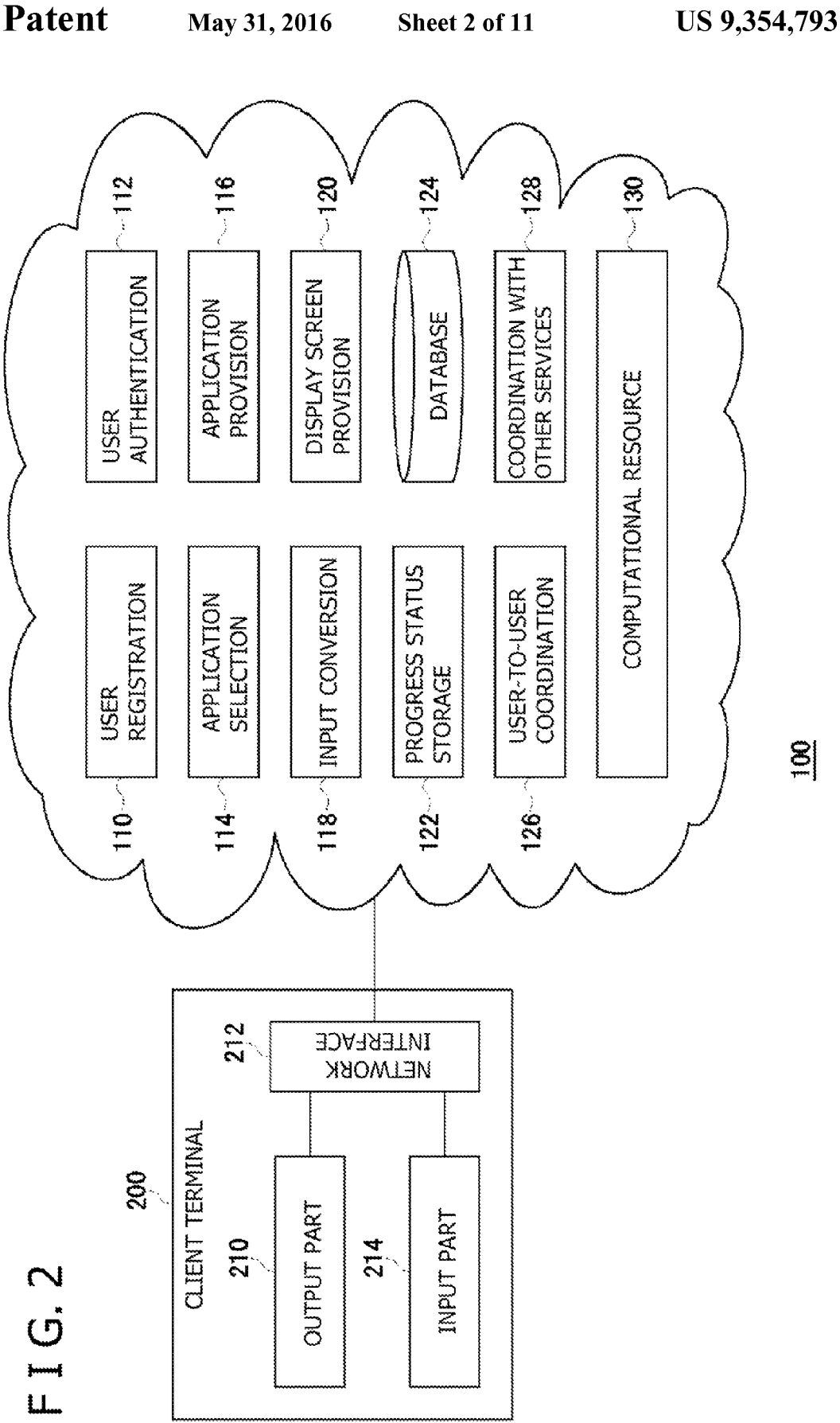
FIG. 2 is a diagram schematically illustrating a cloud computing system according to embodiment 1.

FIG. 2 is a diagram schematically illustrating the cloud computing system 100 according to embodiment 1. FIG. 2 schematically illustrates an example of the cloud computing system 100 shown in FIG. 1 from the viewpoint of a user using the client terminal 200.

The client terminal 200 is, for example, a common PC (Personal Computer). The same terminal 200 includes an output part 210 such as monitor and speaker, an input part 214 such as keyboard, mouse, and touch pad, and a network interface 212 used for communication with the network 300.

The cloud computing system 100 provides a variety of services on demand such as providing applications and storages via a network. A user using the client terminal 200 receiving a service from the cloud computing system 100 operates an interface for providing services shown on the output part 210. The interface is operated via the input part 214. From the viewpoint of the user, it is not necessary for him or her to understand a physical configuration of the cloud computing system 100 or its software configuration to receive provided services. As a result, the same system 100 gives an impression as if the user uses services emerging from network clouds.

The client terminal 200 has a computational resource such as CPU (Central Processing Unit) in most cases. Therefore, at least part of an application can be executed in a local environment of the client terminal 200. However, it is not important for the user using the client terminal 200 whether an application is executed by a local computational resource or by a computational resource of the cloud computing system 100 on the network. The two are identical in that a service can be used. In the present specification, therefore, the term "computational resources of the cloud computing system" or simply "computational resources" refers to the computational resources of at least either the client terminals 200 or the servers of the cloud computing system 100.

The cloud computing system 100 according to embodiment 1 is a system that provides a plurality of applications to registered users. The same system 100 provides, to users, functions and resources of at least user registration 110, user authentication 112, application selection 114, application provision 116, input conversion 118, display screen provision 120, progress status storage 122, database 124, user-to-user coordination 126, coordination with other services 128, and computational resources 130.

The user registration 110 is a function that registers a user wishing to use the cloud computing system 100. Registration as a user allows the cloud computing system 100 to identify the user. For example, it is possible for a user to search for another online user and for the system 100 to support matching between users which will be described later. Further, recording user registration information allows a user to receive the same service from the cloud computing system 100 even if he or she is using a different client terminal 200. It is possible for an operation manager of the same system 100 to perform elaborate operations including billing users and notifying individual users. Registered user information is stored in the database 124.

The user registration 110 also has a function that allows a user to register another user as a friend. Another user registered by a user as a friend will be hereinafter simply referred to as a "friend user."

The user authentication 112 is a function that acquires user information from a user attempting to connect to the cloud computing system 100 and compare it against user information stored in the database 124. The user authentication 112 succeeds when the two pieces of information match as a result of comparison. In this case, the user can use services.

The application selection 114 is a function that allows a user to select a desired application from among those that can be provided by the cloud computing system 100. For example, names of applications that can be provided are presented in list form, or screen shots or thumbnail movies of execution screens of applications are presented in tabular form for selection by a user. The application selection 114 will be described in detail later.

The application provision 116 provides a user with the application selected by the user. More specifically, the application provision 116 is implemented by acquiring a program that implements the application selected by the user from the database 124 and causing the computational resources 130 to execute the program. In the present specification, therefore, the term "providing an application" refers to at least one of the following, one in which a program is executed by a computational resource such as server on a network, and a screen displaying the execution result is provided to the client terminal 200 via the network 300, and another in which a program that implements an application is provided to the client terminal 200 via the network 300, and the computational resource of the client terminal 200 executes the program.

The input conversion 118 is a function that converts an input signal, acquired from the input part 214 of the client terminal 200, into another input signal. More specifically, for example, if an application provided to a user is a game application that has been developed for use on dedicated hardware, the application may be designed to be operated using a dedicated input device such as game controller. On the other hand, the input part 214 is often a general purpose input device such as keyboard and mouse. For this reason, the input conversion 118 converts, for example, a mouse input signal into a game controller input signal. This can be implemented, for example, by detecting a motion vector of a mouse cursor and associating the vector direction with the input direction of an analog controller and the vector's magnitude with the inclination angle of the analog controller.

The display screen provision part 120 is a function that generates GUIs (Graphical User Interfaces) provided to the client terminal 200 such as user authentication screen, application selection screen, and application execution screen. The progress status storage 122 is a function that stores an application progress status in the database 124. For example, if the application is a word processor application, the progress status storage 122 stores a document being created in the database 124. Further, if the application is an RPG (Role-Playing Game) application, the progress status storage 122 stores in the database 124 saved data, status information updated in accordance with the progress of the game such as growth rate of characters to be operated and story's progress status.

The database 124 stores a variety of information required to provide services such as user registration information, application programs, and saved data as described above. In reality, a database which stores application programs and a database which stores user registration information are possibly implemented as physically different databases. In the present specification, however, these databases are simply referred to as the database 124.

The user-to-user coordination 126 is a function that provides a mechanism for users registered as such in the cloud computing system 100 to execute an application in a coordinated fashion. The user-to-user coordination 126 will be described in detail later.

The coordination with other services 128 is a function designed to implement coordination with services different from those provided by the cloud computing system 100 such as SNS (Social Network Service).

The computational resources 130 refer to the computational resources of at least either the servers and others making up the cloud computing system 100 or the client terminals 200 as described above, executing a program that implements an application and contributing to implementation of a service.

The cloud computing system 100 is practically implemented by the plurality of servers 10 and databases 12 as shown in FIG. 1. From the viewpoint of a user, however, the functions provided by the same system 100 are more important than the actual configuration of the same system 100. FIG. 2 schematically illustrates that the different functions provided by the cloud computing system 100 look as if they float in clouds, and that these functions are used from the client terminal 200. As illustrated in FIG. 2, the user using the client terminal 200 cannot see how the functions are connected to implement services. However, this is not important for using services.

A description will be give below of the application selection 114 of the cloud computing system 100 according to embodiment 1 with reference to FIGS. 3 and 4. A description will be given by taking, as an example, a case in which a game application, developed for execution on dedicated hardware, is provided by using an emulator as an application provided by the cloud computing system 100. However, provided applications are not limited to such a game application. For example, it should be understood by those skilled in the art that different types of applications such as business applications are also applicable to the cloud computing system 100 according to embodiment 1.

Figure 3:
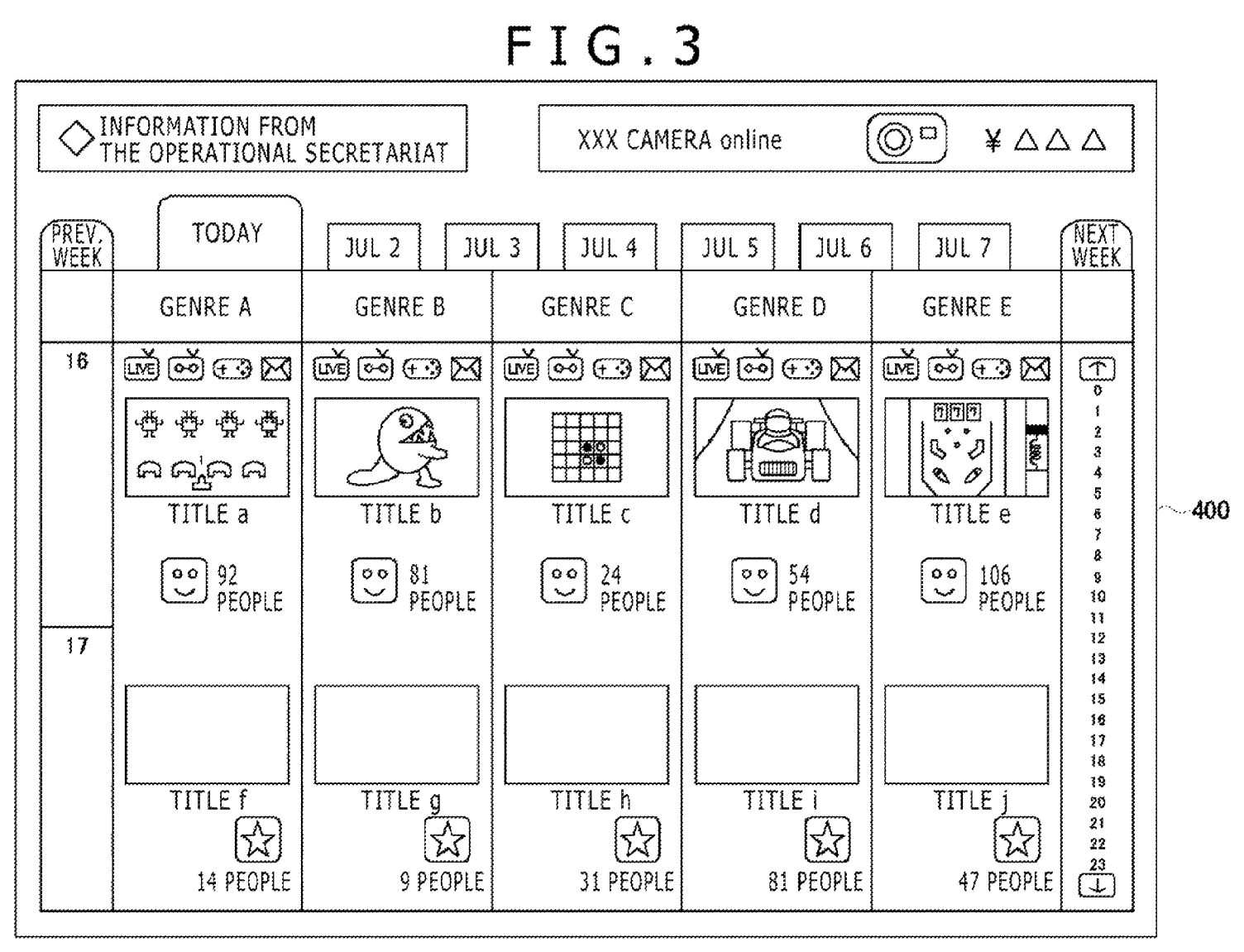

FIG. 3 is a diagram illustrating an example of an application selection screen 400 according to embodiment 1. As illustrated in FIG. 3, the same screen 400 is in tabular form. Thumbnail movies of execution screens of applications are shown in boxes that are classified with the vertical axis representing the time zones, and the horizontal axis the genres. Under each thumbnail movie, an application title associated with the thumbnail movie appears. FIG. 3 assumes that the current time of day is between 4 and 5 pm, and shows an example in which thumbnail movies are displayed for the time zones of "Today." A "LIVE icon," an icon indicating that a thumbnail movie is being provided, appears above the thumbnail movie displayed in the box classified into the current time of day.

A "spectator icon" appears above the thumbnail movie appearing in the box classified into the current time of day. This icon is used to view the execution screen of other user who is provided with the application associated with the thumbnail image. Further, an "execution icon" and a "challenge icon" also appear. The "execution icon" is used to execute the application that is being provided. The "challenge icon" is used to send, to other users, a "challenge" which will be described later. In the example shown in FIG. 3, the LIVE icon is represented by an icon in the form of a television showing the letters "LIVE" in the screen. The "spectator icon" is represented by an icon in the form of a television showing an illustration of eyeglasses in the screen. The "execution icon" is in the form of a game controller used for a common gaming machine. The "challenge icon" is represented by an icon in the form of a horizontally long envelope.

The total number of friend users also appears under the thumbnail movie appearing in the box classified into the current time of day. These friend users are provided with the application associated with the thumbnail movie. The total number of friend users currently provided with the application serves as an indicator for judging whether an application is popular among friends. Users can select applications that are used by a number of friend users, thus allowing the users to compete for game score or play against other players among a larger population.

In each of the boxes classified into one of the times of day that are more future than the box including the current time of day shown in the application selection screen 400, a thumbnail movie of an application scheduled to be provided at that time of day appears. A "favorite icon" appears under the thumbnail movie of the application scheduled to be provided. The "favorite icon" indicates an intention to execute the application associated with the thumbnail movie. The total number of friend users appears under the favorite icon. These friend users have selected this application as their favorites.

If a user selects the "favorite icon," the friend users will be notified that the user selected the "favorite icon." This can be implemented, for example, by the user-to-user coordination 126 transmitting an email to the friend users. This can be also implemented, for example, by the coordination with other services 128 writing a notice to websites of the friend users on an SNS in coordination with other SNSs. This promotes matching between users through the application. Further, the operation manager of the cloud computing system 100 can estimate the server load in the future from the total number of users who have selected the application as their "favorites," thus allowing the manager to reflect this information in the operation plan.

FIG. 3 illustrates a case in which thumbnail movies appear for the "today's" time zones. However, icons also appear which are used to display the previous week's list and the next week's list. Further, the dates of the week starting from today appear. This allows the user to view a list of applications provided on a date by selecting that date. Still further, an interface is also provided which is designed to change the time zones as desired.

A box is provided at an upper portion of the application selection screen 400 for the operation manager of the cloud computing system 100 to notify information to the users. Further, an advertisement box is also provided to display advertisements of a variety of products.

FIG. 3 is a diagram illustrating an example of the application selection screen 400. There are numerous variations of the positional relationship in arrangement between the displayed items, the displayed content, and so on. It should be understood by those skilled in the art that these are also included as an embodiment of the present invention.

Incidentally, a registered user of the cloud computing system 100 can be provided with all the applications that can be provided by the same system 100 on arbitrary dates and times. Although not illustrated, the cloud computing system 100 provides an interface for searching for applications that can be provided. The user can be provided with an application by making a search using the game title, the name of the seller, the release date, the genre and so on as search keys.

As described earlier, the applications provided by the cloud computing system 100 are game applications that were developed in the past, thus amounting to a huge number of applications. Searching for a desired application from among such a huge number of applications can be troublesome, for example, for users wishing to enjoy a game casually by using short spare time. If forced to go through a troublesome process before starting a game, users may become less eager to play a game.

On the other hand, if the number of applications provided increases, the number of users using each application tends to decrease. If there are only a small number of users of an application, an event organized for users to compete for scores with that application, for example, will not be in full swing. From the viewpoint of the operation manager of the cloud computing system 100, the more there are applications to be provided, the more servers 10 and databases 12 must be operated, thus resulting in increased operation cost.

For this reason, the display screen provision 120 of the cloud computing system 100 provides users with the application selection screen 400 shown in FIG. 3. The thumbnail movies shown on the same screen 400 are those of a small number of applications selected from among the applications that can be provided to the users on arbitrary dates and times. Thus, it is possible to concentrate users on a small number of specific applications by intentionally narrowing down options from among a large number of applications to present to users. This makes it easier for users to find opponents of games and companions with whom to play games in cooperation, thus promoting matching between users. This allows the operation manager of the cloud computing system 100 to reduce the operation cost of the servers 10 and so on because the number of applications to be provided decreases.

When a user is registered as such in the cloud computing system 100, the same system 100 issues "tickets" to the user for using the applications. Tickets are, so to speak, a currency for using the applications in the cloud computing system 100. The user is provided with an application by consuming the number of tickets determined for each of the applications.

Users can purchase tickets from the cloud computing system 100 by paying a given price. The same system 100 may provide a given number of tickets free of charge to users every month. Alternatively, the same system 100 may unlimitedly issue tickets to those users who pay a given amount of money every month. Numerous variations including the above are possible for providing tickets. It should be understood by those skilled in the art that use of any of these variations is included as an embodiment of the present invention.

As described earlier, a user can be provided with an application even if it does not appear on the application selection screen 400 among those applications displayed as currently provided ones. At this time, fewer tickets may be required to be provided with an application displayed on the application selection screen 400 as a currently provided application than an application not displayed on the same screen 400. Such an arrangement can give users an incentive to be provided with applications that are currently provided. This is effective in concentrating users on a small number of specific applications.

The application selection screen 400 is similar to a television schedule that assigns programs to specified dates and times in that applications are assigned to specified dates and times. In the case of a television schedule, however, only those programs assigned to a specified date and time can be watched. In contrast, in the case of the application selection screen 400, users can be provided with even those applications that are not assigned to the table. A television schedule and the application selection screen 400 are dissimilar in this respect.

Figure 4:
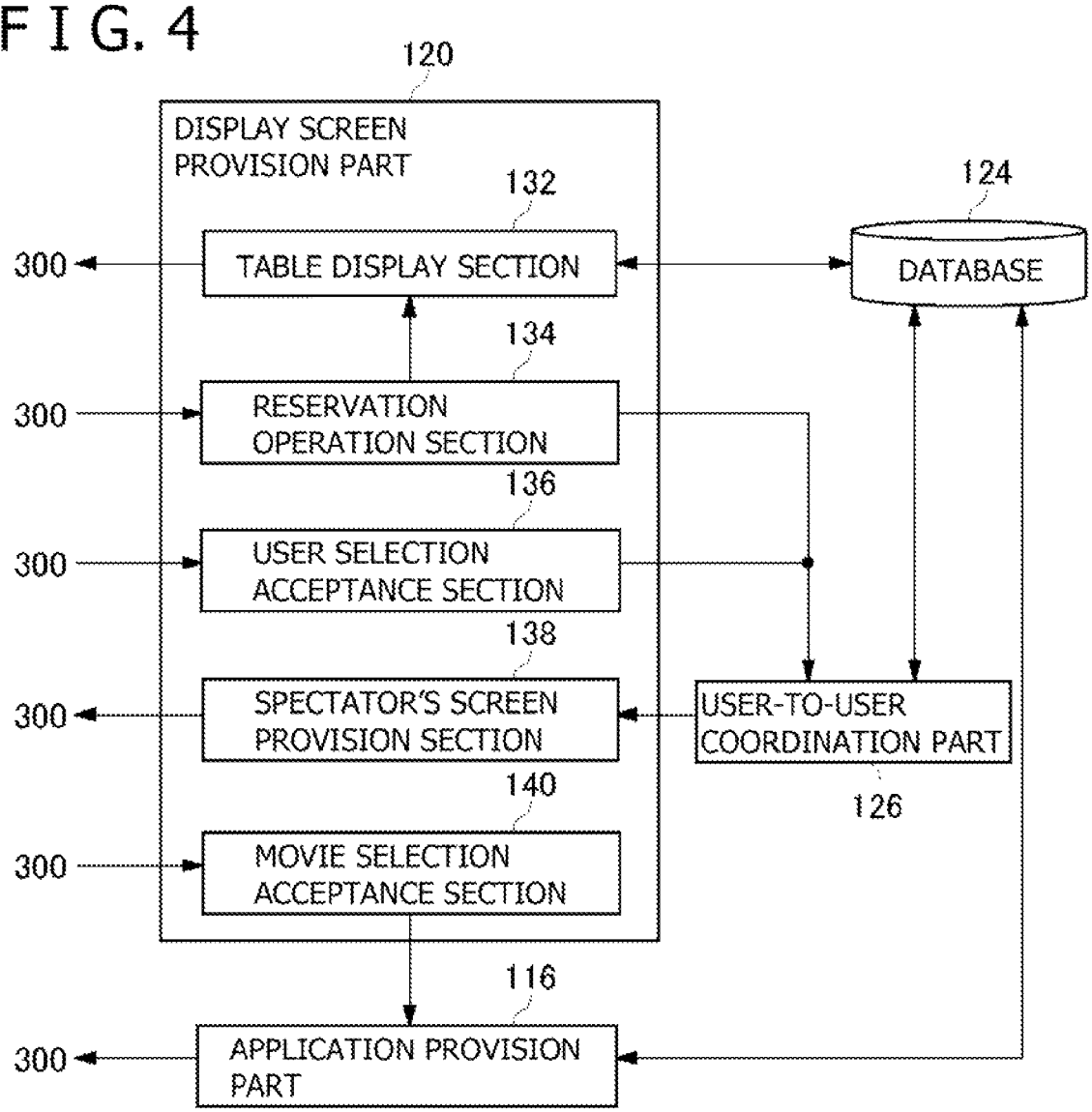
FIG. 4 is a diagram schematically illustrating a functional configuration for providing the application selection screen.

FIG. 4 is a diagram schematically illustrating a functional configuration for providing the application selection screen 400. The function of the display screen provision 120 for providing the application selection screen 400 is implemented as the display screen provision part 120. The same part 120 includes a table display section 132, a reservation operation section 134, a user selection acceptance section 136, a spectator's screen provision section 138, and a movie selection acceptance section 140.

FIG. 4 illustrates a functional configuration for providing the application selection screen 400, and other components are omitted. In FIG. 4, in terms of hardware, the elements given as functional blocks adapted to perform various processes can be formed with the CPUs, main memories, and other LSIs (Large Scale Integrations) of the servers 10 or the client terminal 200 making up the cloud computing system 100. In terms of software, each of the elements can be implemented, for example, by a program loaded into a main memory. Therefore, it should be understood by those skilled in the art that these functional blocks can be implemented in various ways by the computational resource of the cloud computing system 100, and that these blocks are not limited to any one form.

The application selection screen 400 is a table showing a list of thumbnail movies assigned to specified dates and times. The thumbnail movies show the execution screens of a small number of applications selected from among a plurality of applications that can be provided to users using the cloud computing system 100 on arbitrary dates and times. The table display section 132 displays the application selection screen 400 on the client terminal 200 used by a user. Here, the templates and the thumbnail movies of the application selection screen 400 are stored in the database 124. The table display section 132 acquires these pieces of data by referring to the database 124.

The table display section 132 further displays, in the application selection screen 400, the numbers of users who are currently provided with the applications associated with the thumbnail movies shown in the list of the application selection screen 400 in association with these thumbnail movies.

The table display section 132 still further displays, in the application selection screen 400, the reservation operation sections, in association with the thumbnail movies displayed in the boxes that are classified into the times of day that are more future than the box including the current time of day. Each of the reservation operation sections is used to accept, from the user, his or her intention to execute the application associated with the thumbnail movie when the time of day in the future is reached. Here, the reservation operation section is the favorite icon described above.

The movie selection acceptance section 140 acquires a user's selection of a thumbnail movie shown in the application selection screen 400. The application provision part 116 acquires the user's selection from the movie selection acceptance section 140, providing, to the user, the application associated with the thumbnail movie selected by the user.

Here, the application provision part 116 implements the provision of the application. This is accomplished by the computational resource such as the server 10 of the cloud computing system 100 executing the program that implements the user-selected application and transmitting the execution result to the client terminal 200 used by the user. Alternatively, the application provision part 116 may implement the provision of the application by transmitting the program that implements the user-selected application to the client terminal used by the user. A program execution result is generally smaller in amount of information than a program itself. Therefore, the former is advantageous in that the network load can be reduced. In the case of the latter, what primarily handles the execution of the program can be distributed. Therefore, the latter is advantageous in that the load of the servers 10, for example, of the cloud computing system 100 can be reduced.

The user selection acceptance section 136 accepts information identifying a friend user selected by a user. This friend user is selected from among those who are provided with the applications associated with the thumbnail movies shown in the list of the application selection screen 400. Although not illustrated, when the user selects the "spectator icon" in the application selection screen 400, a list of the friend users is displayed who are executing the application associated with the spectator icon. When the user selects a friend user from among users shown in the list, information uniquely identifying the user is transmitted to the user selection acceptance section 136. Here, the term "information uniquely identifying the user" refers to a user name registered in the cloud computing system 100 and a user ID (IDentification) assigned at the time of registration.

The spectator's screen provision section 138 displays, on the user terminal, the execution screen of the application under execution by the user-selected friend user. The user watching the execution screen of the application cannot practically execute the application. However, he or she can find out what kind of the application it is. Further, the user can also share the space with other friend users by using an interface such as existing chat interface.

The operation by using the above configuration is as described below. A user registered as such in the cloud computing system 100 according to embodiment 1 selects a thumbnail movie that appears on the application selection screen 400 displayed on the output part 210 of the client terminal 200. The application provision part 116 provides, to the user, the application associated with the user-selected thumbnail movie.

Here, the thumbnail movies appearing in the application selection screen 400 are those of a small number of applications selected from among the applications that can be provided to the users on arbitrary dates and times. Embodiment 1 of the present invention concentrates users on a small number of specific applications by intentionally narrowing down options from among a large number of applications to present to the users.

As described above, embodiment 1 of the present invention provides a technology for promoting communications between users through applications provided by the cloud computing system 100.

[Embodiment 2]

Embodiment 2 will be outlined. The cloud computing system 100 according to embodiment 2 provides the same game to different users under the same condition via a network, irrespective of whether the original game is a head-to-head type game. This allows even users located remotely from each other to play against each other asynchronously in various games. Matching between users is promoted through applications, thus promoting communications between users.

Embodiment 2 can coexist with embodiment 1. In the description given below, the description that overlaps that of the cloud computing system 100 according to embodiment 1 will be omitted or simplified as appropriate. A description will be given by taking, as an example, a case in which a game application, developed for execution on dedicated hardware, is provided by using an emulator as an application provided by the cloud computing system 100 as with embodiment 1.

Figure 5:
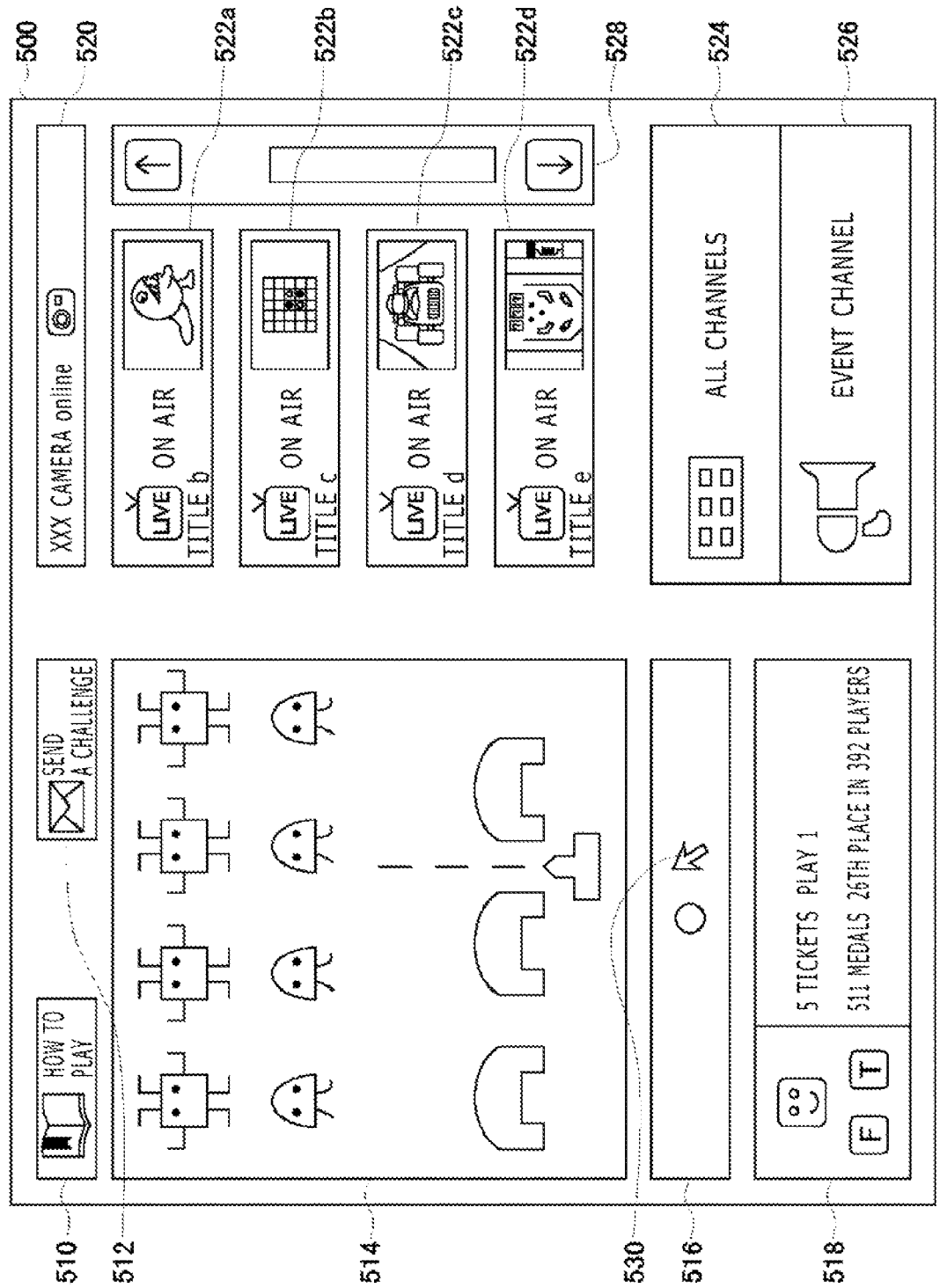
FIG. 5 is a diagram illustrating an example of an application provision screen according to embodiment 2.

FIG. 5 is a diagram illustrating an example of an application provision screen 500 according to embodiment 2. As illustrated in FIG. 5, the same screen 500 provides, to users, a variety of user interfaces including an application execution screen 514.

An operation area 516 is an interface used by a user to control a game displayed on the application execution screen 514 by using a mouse, one of the input parts 214 of the client terminal 200. As described earlier, an application displayed on the application execution screen 514 is a game application that has been developed to be controlled with a dedicated controller. For this reason, the input conversion 118 converts the motion of a cursor 530 in the operation area 516 into an input signal of the game controller.

Areas that are collectively referred to as a live area 522 and denoted by reference signs 522a to 522d display the same thumbnail movies as those appearing in the box including the current time in the application selection screen 400. The live area 522 also displays the thumbnail movies of the applications currently provided to the friend users. If there are thumbnail movies that cannot be displayed in the live area 522, such thumbnail movies can be displayed by the user operating a slider bar 528.

An operation description icon 510 is used to display how to play an application provided on the application execution screen 514. Although not illustrated, when the user selects the operation description icon 510, a so-called help file is displayed for the application currently provided. The help file covers how to operate characters of interest and other information.

A user information area 518 displays user-specific information including the number of tickets owned by the user. The same area 518 also displays links to the user's website, other SNS, and microblog, and the number of medals owned by the user. Here, the term "medal" refers, so to speak, to a decoration in the cloud computing system 100. If a user beats other user, for example, he or she can increase the number of medals by receiving medals from the other user. The user information area 518 also displays the rank of the user in descending order of the number of medals owned.

A display all channels icon 524 is used to display a list of the thumbnail movies of the applications that can be provided by the cloud computing system 100. Although not illustrated, when the user selects the display all channels icon 524, a list of the thumbnail movies of the applications is displayed.

A display event channel icon 526 is used to display an event organized by the operation manager of the cloud computing system 100. The term "event organized by the operation manager" refers, for example, to an event in which users compete for game scores using a specified application, and medals are awarded to the champion. The term alternatively refers to an event in which a tournament for a specified head-to-head type game application is organized, and medals are awarded to the champion. Thus, by drawing attention of many users to specific applications through events, it is possible to promote matching between users through applications.

An advertisement box 520 is an area for displaying advertisements of a variety of products. An announcement box from the operation manager of the cloud computing system 100 (not shown in FIG. 5) can be provided in the application provision screen 500 as with the application selection screen 400 shown in FIG. 3.

A challenge icon 512 is used by a user to send a "challenge" to a friend user. Here, the term "challenge" refers, for example, to a message from a user to notify a friend user of a specified game application and a goal to be achieved in the game. The friend user who received the challenge can freely select whether to accept or reject the challenge. If he or she accepts the challenge, the friend user plays the specified game. The achievement level of the user who sent the challenge against the goal is compared against that of the friend user. The user who has reached a higher achievement level acquires medals. It should be noted that if the user selects the challenge icon 512 in the application provision screen 500, the game application under execution on the application execution screen 514 is specified.

FIG. 5 is a diagram illustrating an example of the application provision screen 500. There are numerous variations of the positional relationship in arrangement between the displayed items, the displayed content, and so on. It should be understood by those skilled in the art that these are also included as an embodiment of the present invention.

A description will be given below of the mechanism for matching between users using a challenge.

Figure 6:
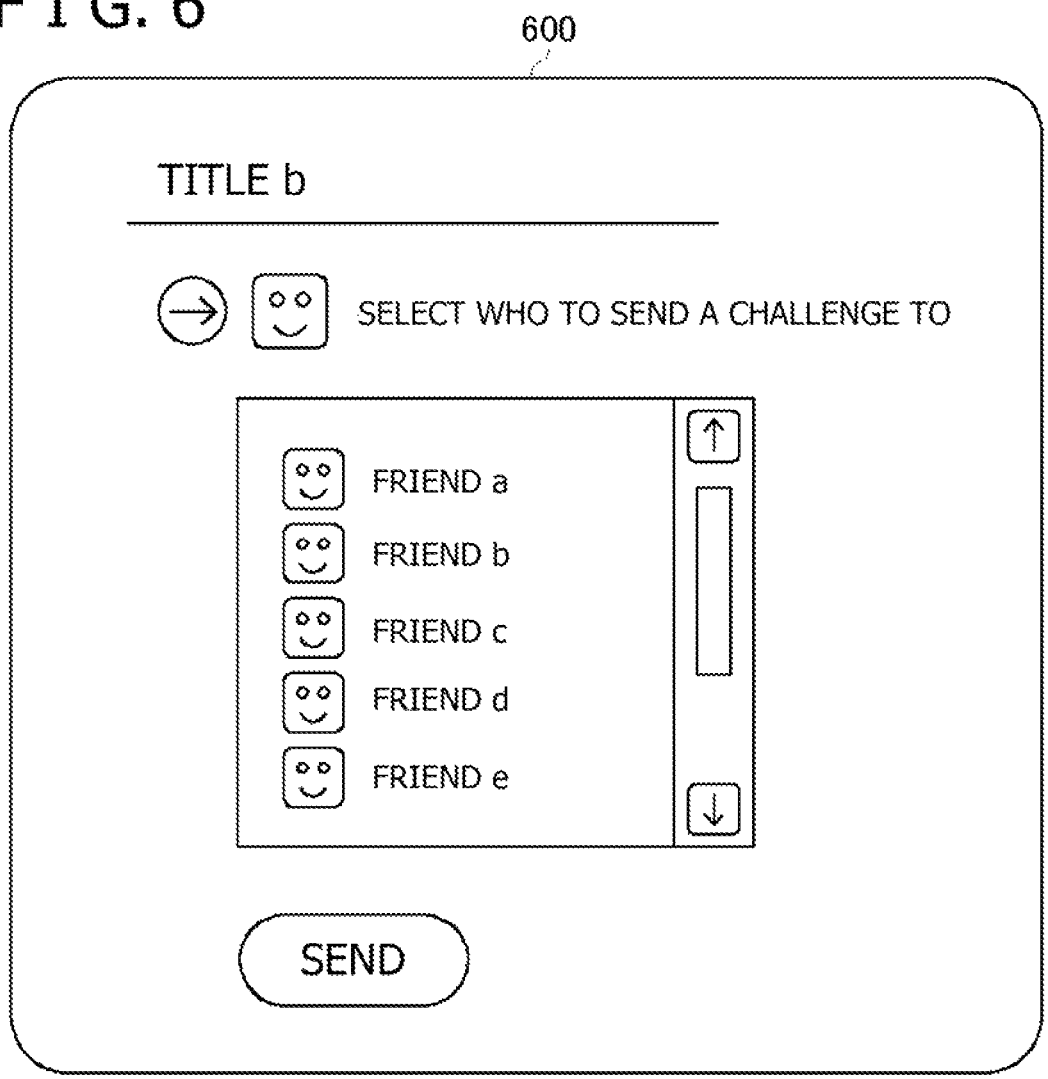
FIG. 6 is a diagram illustrating an example of a friend selection interface in a challenge.

FIG. 6 is a diagram illustrating an example of a friend selection interface 600 in a challenge. As illustrated in FIG. 6, the same interface 600 shows a list of friend users so that the user selects a friend user from among those shown in the list. It should be noted that when a user selects the challenge icon 512, the user-to-user coordination 126 acquires the friend user by referring to the database 124. The display screen provision 120 causes the friend selection interface 600 to be displayed on the output part 210 of the client terminal 200 used by the user.

Figure 7:
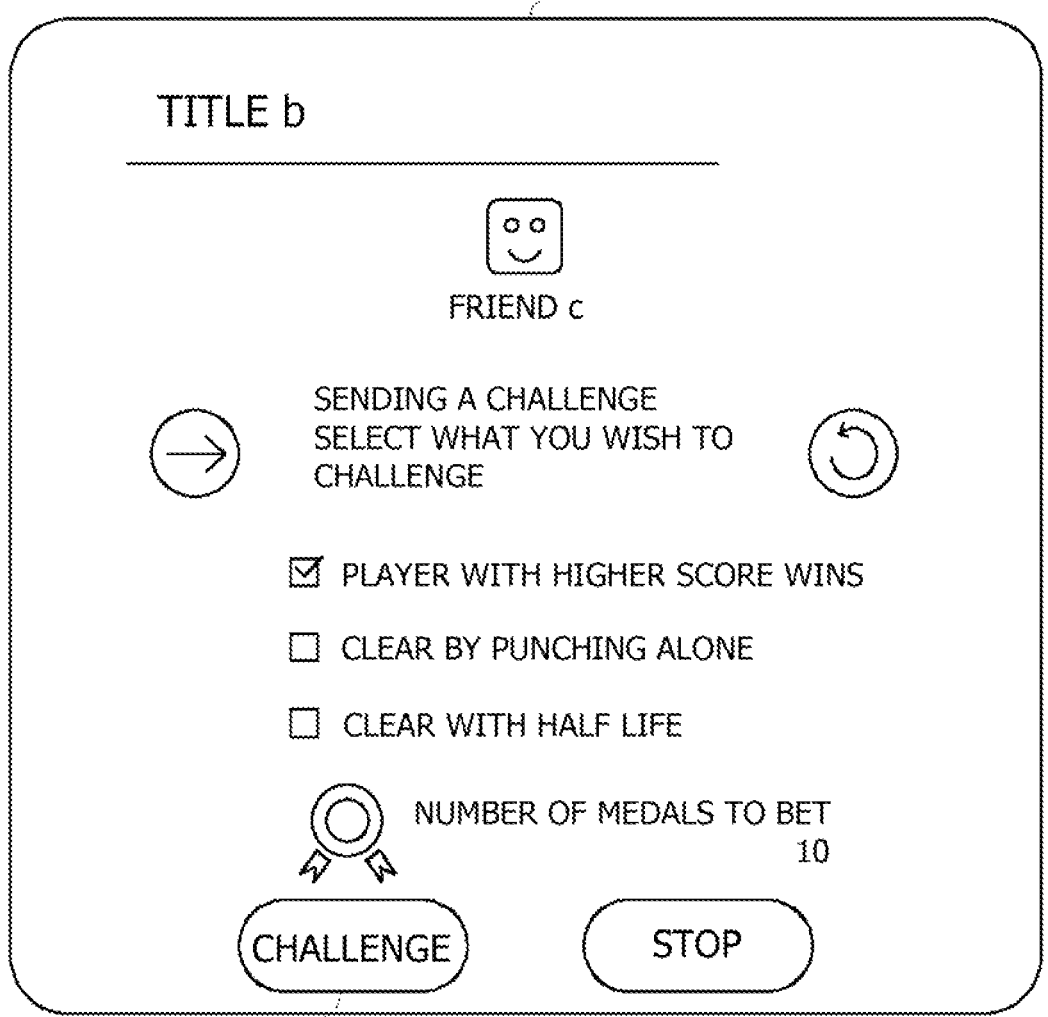
FIG. 7 is a diagram illustrating an example of a goal setting interface in a challenge.

FIG. 7 is a diagram illustrating an example of a goal setting interface 700 in a challenge. When a user selects a friend in the friend selection interface 600, the display screen provision 120 causes the goal setting interface 700 to be displayed on the output part 210 of the client terminal 200 used by the user. As illustrated in FIG. 7, the same interface 700 shows a list of goals to be achieved in the game application. The user selects one of the goals shown in the list. The goal setting interface 700 also shows the number of medals to bet in the challenge. The user with a higher achievement level against the goal acquires the bet medals. It should be noted that the number of medals to bet is changed according to the set difficulty level of the goal. The more difficult it is to achieve the goal, the larger the number of medals. As for the goal to be achieved, on the other hand, a goal appropriate for the game application is set in advance by the operation manager of the cloud computing system 100.

When the user presses a challenge button 710 in the goal setting interface 700 after setting a goal, the display screen provision 120 causes the application provision screen 500 to be displayed on the output part 210. The user executes the game on the application execution screen 514 of the application provision screen 500. If the goal set by the user is, for example, "Player with higher score wins," the score acquired in the game after the game ends serves as an achievement level. On the other hand, if the goal set by the user imposes a limiting condition such as "Clear by punching alone," whether the condition is met serves as an achievement level.

Figure 8:
FIG. 8 is a diagram illustrating an example of a challenge reception interface.

FIG. 8 is a diagram illustrating an example of a challenge reception interface 800 in a challenge. When a user ends a game application specified in a challenge, the display screen provision 120 causes the challenge reception interface 800 to be displayed on the output part 210 of the client terminal 200 used by a friend user under control of the user-to-user coordination 126. As illustrated in FIG. 8, the name of the user who sent a challenge, the title of the specified game application and the goal to be achieved in the game application are given in the challenge reception interface 800.

The friend user who received the challenge can select at will whether to accept or reject the challenge. If the friend user rejects the challenge, he or she presses a reject button 810 in the challenge reception interface 800. Although not illustrated, when the friend user selects the reject button 810, a message is displayed on the output part 210 of the client terminal 200 used by the user who sent the challenge. The message is to the effect that the friend user has rejected the challenge.

If the friend user wishes to practice by executing the game application before accepting the challenge, he or she presses a practice button 812. When the friend user presses the practice button 812, the application provision screen 500 is displayed on the output part 210 so that the friend user can practice the game.

If the friend user wishes to put on hold whether to accept or reject the challenge, he or she presses a stop button 816 in the challenge reception interface 800. If a given period of time elapses with the challenge kept on hold by the friend user, the friend user is considered to have rejected the challenge. Here, the term "a given period of time" refers to an acceptance determination period defined for the friend user to determine whether to accept or reject the challenge. The length of the acceptance determination period may be defined experimentally in consideration of the cost required to maintain and manage challenges and the period of time for which users can maintain his or her motivation. The acceptance determination period is, for example, three days. If the friend user does not accept the challenge within the acceptance determination period, the challenge is deleted from the cloud computing system 100. By defining the acceptance determination period, it is possible to prevent challenges, transmitted to friend users who have no intention to accept them, from remaining in the cloud computing system 100.

If the friend user accepts the challenge, he or she presses an accept button 814 in the challenge reception interface 800. When the friend user presses the accept button 814, the application provision screen 500 is displayed on the output part 210, and the friend user executes the specified game application. When the execution of the game application by the friend user ends, the user-to-user coordination 126 acquires the achievement level of the friend user against the goal.

The user-to-user coordination 126 compares the achievement level of the user who sent the challenge against that of the friend user, thus determining which user won the game or whether they drew the game. The display screen provision 120 causes the determination result of the user-to-user coordination 126 to be displayed on both the client terminal 200 used by the user who sent the challenge and the client terminal 200 used by the friend user for notification.

If the friend user is defeated in the challenge posed by the user, he or she can send back a challenge to the user and play the game again. A detailed description will be given later of sending back a challenge.

From the above, a user and his or her friend user can play against each other through a single game application. Because a user and his or her friend user communicate via the cloud computing system 100, they can play against each other even if they are located remotely from each other. Further, because they compete for achievement level against a goal raised as a "theme" by the user, the user and his or her friend user need not play the game at the same time. This allows the user and friend user to play against each other asynchronously.

As described above, the user and his or her friend user compete for achievement level against the set goal. As for the goal, a condition appropriate as the goal of the specified game application is set in advance by the operation manager of the cloud computing system 100. This allows users to play against each other not only in a game application such as fighting game that has been developed for users to play against each other but also in a non-head-to-head game application such as crossword puzzle game. As a result, users can play against each other in a variety of games asynchronously, promoting matching between users through applications.

Figure 9:
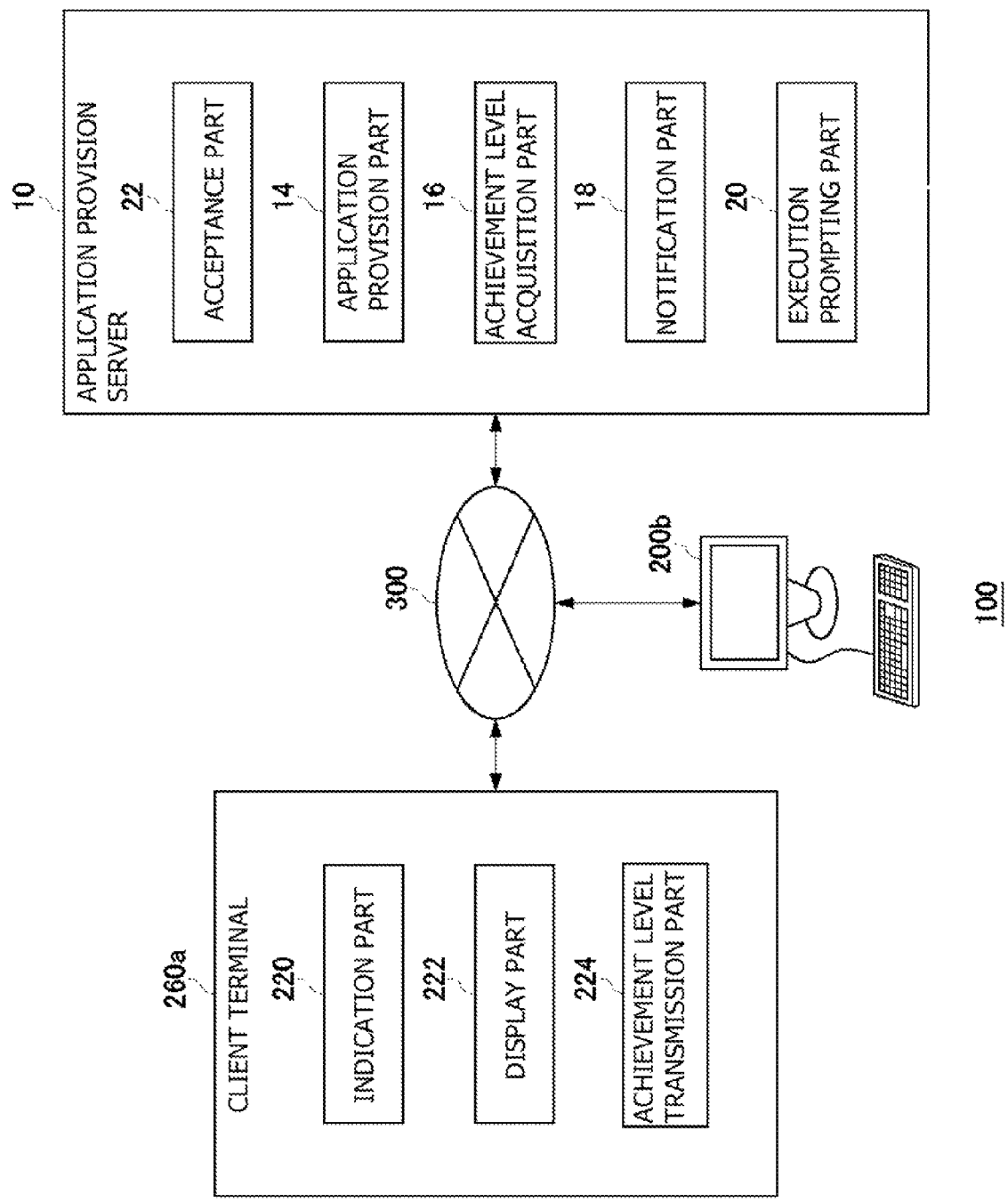
FIG. 9 is a diagram schematically illustrating a functional configuration for providing user-to-user coordination using a challenge.

FIG. 9 is a diagram schematically illustrating a functional configuration for providing user-to-user coordination using a challenge. The mechanism for providing user-to-user coordination using a challenge is implemented by the client-server type cloud computing system 100. The same system 100 includes the client terminal 200 and the application provision server 10 that are connected via the network 300.

In the cloud computing system 100, the client terminal 200a used by a user and the client terminal 200b used by a friend user are connected to the application provision server 10 via the network 300.

The client terminal 200 includes an indication part 220, a display part 222, and an achievement level transmission part 224. The indication part 220 is an input interface such as keyboard, mouse, and touch pad. The display part 222 is, for example, a monitor. The indication part 220 corresponds to the above-described input part 214, and the display part 222 to the above-described output part 210. The achievement level transmission part 224 will be described later.

The application provision server 10 includes an acceptance part 22, an application provision part 14, an achievement level acquisition part 16, a notification part 18, and an execution prompting part 20.

The indication part 220 of the client terminal 200a indicates, to the application provision server 10, a selection of a game application by a user using the client terminal 200a, a goal to be achieved in the game application, and a specification of a friend user who will be the opponent in the game application.

The acceptance part 22 of the application provision server 10 accepts, from the indication part 220 of the client terminal 200a, the selection of a game application, the goal to be achieved in the game application, and the specification of a friend user who will be the opponent in the game application. The application provision part 14 provides the user-specified game application to the client terminal 200a used by the user. The display part 222 of the client terminal 200a displays the application provision screen 500.

The achievement level transmission part 224 of the client terminal 200a transmits the achievement level against the goal to the application provision server 10 after the game application is ended by the user. The achievement level acquisition part 16 of the same server 10 acquires the achievement level of the user against the goal from the achievement level transmission part 224. The execution prompting part 20 notifies a challenge to the client terminal 200b used by the friend user after the game application is ended by the user. The challenge includes a message prompting the execution of the game application executed by the user and the goal set by the user.

If the friend user does not accept the challenge and does not execute the game application within the acceptance determination period, the notification part 18 of the application provision server 10 notifies the client terminal 200a used by the user that the friend user does not execute the game application.

If the friend user accepts the challenge within the acceptance determination period, the application provision part 14 also provides, to the friend user, the game application that was provided to the user. The achievement level transmission part 224 of the client terminal 200b transmits the achievement level of the friend user against the goal to the application provision server 10 after the game application is ended by the friend user. The achievement level acquisition part 16 of the same server 10 acquires the achievement level of the friend user from the achievement level transmission part 224 of the client terminal 200b. The notification part 18 compares the achievement levels of the user and the friend user acquired by the achievement level acquisition part 16. The notification part 18 causes the display parts 222 of the client terminals 200 used by the user and the friend user to display which user is higher in achievement level for notification.

Here, a comparison part may be provided in the cloud computing system 100 to compare the achievement levels of the user and the friend user. The comparison part is executed by the computational resource of the cloud computing system 100. Therefore, the comparison part is included in at least either the client terminal 200 or the application provision server 10.

The indication part 220 and the display part 222 described above belong to each of the client terminals 200. If they belong to the server 10, users cannot use these parts, which is meaningless. On the other hand, the application provision part 14, the execution prompting part 20, and the comparison part, for example, hold as an embodiment of the present invention irrespective of whether they belong to the client terminal 200 or the server 10. Thus, the cloud computing system 100 offers freedom in the configuration of each part and what primarily handles the process. All cases are not specified because this results in complication due to much duplication, making the key factors of the present invention ambiguous instead. However, it should be understood by those skilled in the art that all cases are included in the embodiments of the present invention.

The client terminals 200 and the application provision server 10 are part of the cloud computing system 100. The application provision server 10 need not physically be a single server. The functions of the parts described above are collectively called the application provision server 10. In terms of hardware, each part of the same server 10 can be formed with the CPU, main memory, and other LSIs of the server 10 or the client terminal 200 making up the cloud computing system 100. In terms of software, each of the parts can be implemented, for example, by a program loaded into the main memory. Therefore, it should be understood by those skilled in the art that these parts can be implemented in various ways by the computational resource of the cloud computing system 100 and are not limited to any one form.

FIG. 10 is a first half of a flowchart illustrating a flow of processing a challenge according to embodiment 2. The process shown in this flowchart beings, for example, when a user logs into the cloud computing system 100.

When the user selects the challenge icon 512 (S10), the display screen provision 120 provides the friend selection interface 600 to the user. When the user selects a friend to send a challenge to (S12), the display screen provision 120 provides the goal setting interface 700 to the user. When the user selects a goal, a "theme" (S14), the application provision part 14 provides the user-specified game application to the user. The user plays the provided game application to achieve the "theme" (S16). When the game ends (S18), the notification part 18 sends a challenge to the friend user (S20).

When the challenge arrives at the client terminal 200b used by the friend user from the user (S22) and then the friend user accepts the challenge within three days, an acceptance determination period, (Y in S24), the application provision part 14 provides the user-specified game application to the friend user. The friend user plays the provided game application to achieve the "theme" (S26). When the game ends (S28), the comparison part compares the achievement levels of the two users.

When the friend user wins as a result of comparison (Y in S30), the friend user acquires the bet medals (S32). If the friend user loses (N in S30), he or she selects whether to acknowledge the defeat and lose the medals or send back a challenge to the user to play again (S34). When the friend user selects to lose the medals, the user acquires the bet medals (S36). On the other hand, if the friend user wins and acquires the medals, the user loses as many medals as the friend user acquired (S38).

If the friend user does not accept the challenge within three days, the acceptance determination period, or if the friend user rejects the challenge (N in S24), the challenge expires (S40). The notification part 18 notifies the user that the challenge was not accepted (S42).

FIG. 11 is a second half of the flowchart illustrating the flow of processing a challenge according to embodiment 2. FIG. 11 illustrates the flow of a process in which the friend user who was defeated in the challenge against the user sends back a challenge to the user.

When the friend user loses, an icon (not shown) appears on the display part 222 of the client terminal 200b used by the friend user to send back a challenge to the user. When the friend user selects the icon for sending back a challenge to the user (S44), the application provision part 14 provides the user-specified game application to the friend user. The friend user plays the provided game application to achieve the user-specified "theme" (S46). When the game ends (S48), the notification part 18 sends a challenge to the user (S50).

When the challenge arrives at the client terminal 200a used by the user from the friend user (S52) and then the user accepts the challenge within three days, the acceptance determination period, (Y in S54), the application provision part 14 provides the user-specified game application to the user. The user plays the provided game application to achieve the "theme" (S56). When the game ends (S58), the comparison part compares the achievement levels of the two users.

When the user wins as a result of comparison (Y in S60), the user acquires the bet medals (S62). If the user loses (N in S60), he or she loses the bet medals (S64). The friend user acquires as many medals as the user lost (S66). On the other hand, if the user wins and acquires the medals, the friend user loses as many medals as the user acquired (S68).

If the user does not accept the challenge within three days, the acceptance determination period, or if the user rejects the challenge (N in S54), the challenge expires (S70). The notification part 18 notifies the friend user that the challenge was not accepted (S72).

The following operation is carried out in the above configuration. When a user registered as such in the cloud computing system 100 according to embodiment 2 specifies a friend user and sends a challenge, the cloud computing system 100 provides the same game specified in the challenge to the user and the friend user under the same condition.

As described above, embodiment 2 of the present invention allows even users spatially remote from each other to play against each other asynchronously in various games. This promotes matching between users through applications, thus promoting communications between users through applications.

Embodiments 1 and 2 have been described up to this point. An arbitrary combination of these embodiments is also effective as an embodiment of the present invention. A new embodiment resulting from the combination of embodiments 1 and 2 has the advantageous effects of the two combined embodiments.

The present invention has been described by way of embodiments up to this point. It should be understood by those skilled in the art that the embodiments are illustrative, that various modification examples are possible for the combinations of the different components and the different processes thereof, and that these modification examples also fall within the scope of the present invention.

[Modification Example 1]

A case was described in relation to the above-described embodiment 1 in which the total number of friend users is displayed in the application selection screen 400 who are provided with the application associated with the thumbnail movie. In place of the total number of friend users, or in addition thereto, the total number of users of all those registered in the cloud computing system 100 may be displayed who are provided with the application associated with the thumbnail movie. This allows users to find out the popularity of applications among a larger population. This popularity serves as an incentive for users having preference for highly popular applications to select that application, thus providing an effective way of concentrating users on a small number of specific applications.

[Modification Example 2]

A case was described in relation to the above-described embodiment 2 in which a user sends a challenge to a friend user by pressing the challenge icon 512 in the application provision screen 500. A challenge icon is also available in the application selection screen 400 as described above. Therefore, a user can send a challenge to a friend user by pressing the challenge icon in the same screen 400. After the user presses the challenge icon in the application selection screen 400, the cloud computing system 100 operates in the same manner as after the challenge icon 512 is pressed in the application provision screen 500. It is possible to activate matching between users by providing a number of arrangements for matching between users.

[Modification Example 3]

An example was described in relation to the above-described embodiments 1 and 2 in which game applications, developed for execution on dedicated hardware, are provided by using an emulator as applications provided by the cloud computing system 100. Here, as for units in which an application is provided, an application may be provided in small units into which the application is divided rather than entirely. For example, if a game has stages that serve as units, the game is provided in units of a stage. Alternatively, if a game has so-called "boss battles," the game is provided only in units of a boss battle.

Recent advances in microprocessors and personal digital assistants have provided an environment where games can be enjoyed with ease without being restricted by location or time, putting the number of users enjoying games during a short spare time on the increase. This has pushed up demand for game use for enjoying games in small units and only for a short period. For this reason, by providing, in small units, applications that end in a short period of time as described above, it is possible to meet user demand for enjoying games with ease during a short spare time by using services provided by the present cloud computing system 100. This makes it possible to create a new business of reusing game programs developed in the past by taking advantage of the cloud computing technology.

[Modification Example 4]

A case was described in relation to the above-described embodiment 2 in which a user sends a challenge to a friend user via the application provision server 22. A server-client type system configuration is not essential for users spatially remote from each other to play against each other asynchronously in various games. For example, the client terminal 200a used by a user and the client terminal 200b used by a friend user may be connected by P2P (Peer to Peer). A description will be given below of this case.

If the client terminal 200a used by the user and the client terminal 200b used by the friend user are connected by P2P, the functions of the application provision server 10 are performed at least by one of the client terminals 200a and 200b.

A processor of the client device 200a used by the user selects a program for implementing a user-specified game application from a recording part in the client device 200a. The processor of the client device 200a acquires a goal to be achieved in the selected game application from the user and sets the goal. Further, the processor of the client device 200a acquires a friend user who will be the opponent in the selected game application from the user and specifies the friend user as the opponent.

The processor of the client device 200*a* executes the program for implementing the user-specified game application. After the user plays and ends the game application, the processor of the client device 200*a* acquires the user's achievement level against the goal specified by the user.

After the user ends the game application, the processor of the client device 200*a* provides the game application executed by the user to the friend user together with the goal specified by the user. This can be implemented by the processor of the client device 200*a* executing the program for implementing the game application and providing an execution result display screen to the client device 200*b* via a network. Alternatively, the processor of the client device 200*a* may provide the program for implementing the game application to the client device 200*b* via the network for execution of the program by a processor of the client device 200*b*. In any case, the client device 200*a* serves as a server of the client device 200*b*.

After the friend user plays and ends the game application, the processor of the client device 200*b* acquires the friend user's achievement level against the goal specified by the user.

The processor of the client device 200*a* acquires the friend user's achievement level from the client device 200*b* via the network, and compares the achievement levels of the user and the friend user. The processor of the client device 200*a* not only transmits the comparison result to the client device 200*b* but also displays the comparison result on a display part of the client device 200*a*. The processor of the client device 200*b* acquires the comparison result from the processor of the client device 200*a* and displays the comparison result on a display part of the client device 200*b*.

Alternatively, the processor of the client device 200*b* may acquire the user's achievement level from the client device 200*a* via the network, and compare the achievement levels of the user and the friend user. In this case, the processor of the client device 200*b* not only transmits the comparison result to the client device 200*a* but also displays the comparison result on the display part of the client device 200*b*. The processor of the client device 200*a* acquires the comparison result from the processor of the client device 200*b*, and displays the comparison result on the display part of the client device 200*a*.

Summing up the above, the embodiment according to modification example 4 is a peer-to-peer head-to-head system that includes at least two client terminals, namely, a first client terminal used by a first user and a second client terminal used by a second user. This system includes a game selection step, a goal setting step, an opponent specification step, an execution step, a first achievement level acquisition step, an application provision step, a second achievement level acquisition step, a comparison step, and a display step. The game selection step selects the game application specified by the first user. The goal setting step sets a goal to be achieved in the game application. The opponent specification step specifies a user who will be the opponent in the game application. The execution step executes the game application specified by the first user. The first achievement level acquisition step acquires the achievement level of the first user against the goal after the first user ends the game application. The application provision step provides the game application executed by the first user to the second user together with the goal after the first user ends the game application. The second achievement level acquisition step acquires the achievement level of the second user against the goal after the second user ends the game application. The comparison step compares the achievement levels of the first and second users. The display step displays the result of comparison between the achievement levels of the first and second users.

Here, a processor of the first client terminal performs the game selection step, the goal step, the opponent specification step, the execution step, the first achievement level acquisition step, and the display step. On the other hand, a processor of the second client terminal performs the second achievement level acquisition step and the display step. The application provision step and the comparison step are performed by at least either of the processors of the first and second client terminals.

As described above, as the above functions of the application provision server 10 are handled by at least either of the client terminals 200*a* and 200*b*, it is possible to allow users to play against each other in a variety of games asynchronously even if the users are connected by P2P. As compared with the above-described embodiment 2, there is no need for the dedicated application provision server 10, thus making modification example 4 advantageous in that users can play against each other asynchronously using a simple configuration.

REFERENCE SIGNS LIST

10 Application provision server, 14 Application provision part, 16 Achievement level acquisition part, 18 Notification part, 20 Execution prompting part, 22 Acceptance part, 100 Cloud computing system, 116 Application provision part, 132 Table display section, 134 Reservation operation section, 136 User selection acceptance section, 138 Spectator's screen provision section, 140 Movie selection acceptance section, 200 Client terminal, 210 Output part, 212 Network interface, 214 Input part, 220 Indication part, 222 Display part, 224 Achievement level transmission part, 300 Network, 400 Application selection screen, 500 Application provision screen, 510 Operation description icon, 512 Challenge icon, 514 Application execution screen, 516 Operation area, 518 User information area, 520 Advertisement box, 522 Live area, 524 Display all channels icon, 526 Display event channel icon, 528 Slider bar, 530 Cursor, 600 Friend selection interface, 700 Goal setting interface, 800 Challenge reception interface.

INDUSTRIAL APPLICABILITY

The present invention is applicable to a cloud computing system and an application provision method using the same.

The invention claimed is:

1. A cloud computing system having a plurality of computational resources that are connected via a network, the cloud computing system comprising:
 one or more microprocessors, wherein at least one of said microprocessors is programmed to:
  display, on a terminal used by a user using the cloud computing system;
   a table showing a list of selectable game applications for execution, said list of selectable game applications selected from among a plurality of game applications that can be provided on arbitrary dates and times to the user, the table assigning each of the selectable game applications to specified dates and times, such that each selectable game application is displayed in a particular date and time, and
   a respective challenge icon in association with each selectable game application displayed in the particular date and time, each challenge icon operating, when selected by the user, to send a challenge to another user, relating to the playing of the associated game application, said challenged other user becoming an opponent upon accepting said challenge;

acquire a user's selection from the table;

provide a game application, associated with the selection by the user, to the user;

display, for each of the listed game applications in the table, an indicator of the number of users who are different from the user provided with the game application and who are linked in advance to the user; and receive an acceptance of the user's challenge from the other user, wherein the selected game application giving rise to said challenge is played asynchronously by said user and said opponent.

2. The cloud computing system of claim 1 wherein at least one of said microprocessors is programmed to:

accept information identifying another user selected by the user from among users who are provided with the listed selectable game applications; and cause an execution screen of a game application under execution by the other user selected by the user to be displayed on the user terminal.

3. The cloud computing system of claim 1, wherein at least one of said microprocessors further displays, in association with related information displayed in a box that is classified into a time of day that is more future than a box including the current time of day, a reservation operation section used to accept, from the user, his or her intention to execute a game application associated with the related information when the time of day in the future is reached.

4. The cloud computing system of claim 3 wherein at least one of said microprocessors is programmed to notify a friend user of the user that the user has expressed his or her intention.

5. The cloud computing system of claim 1, wherein a program that implements the game application is executed by a computational resource of a server of the cloud computing system.

6. The cloud computing system of claim 1, wherein a game application provision program that controls at least one of said microprocessors transmits the program that implements the application to the user's terminal, and the program is executed in the user's terminal.

7. The cloud computing system of claim 1, wherein each selectable game application is displayed as a thumbnail movie of execution screens that may be selected for execution by the user.

8. The cloud computing system of claim 7, wherein at least one of said microprocessors is programmed to display a spectator icon link above the thumbnail movie appearing in the particular date and time, wherein said spectator icon is used to view the execution screen of one of said other users who are provided with the game application represented by the thumbnail image, display an execution icon used to execute the game application that is being provided to said other users, display a favorite icon under the thumbnail movie of a game application to be provided, said favorite icon indicates an intention of a user to execute the game application associated with the thumbnail movie, and displaying the total number of friend users who have also selected said game application as their favorite, wherein each of said friend users is notified when any other of said friend users selects said favorite icon, wherein a user's progress status in a selected game application is stored in a database of said cloud computing system, wherein a user can view a listing of game applications provided on a particular date by selecting said date.

9. The cloud computing system of claim 7, wherein selection of said spectator icon generates a list of friend users who are executing the game application associated with the spectator icon, wherein selection of one of said friend users causes said at least one microprocessor to display the execution screen of the game application being executed by the user-selected friend user.

10. The cloud computing system of claim 7, further comprising a challenge reception interface configured to receive a challenge request comprising the name of the user who sent the challenge, the title of the game application giving rise to the challenge, and the goal to be achieved in the game application.

11. The cloud computing system of claim 7, at least one of said microprocessors is programmed to notify said challenged user of said challenge.

12. The cloud computing system of claim 1, wherein at least one of said microprocessors is programmed to display, on the user terminal, the execution screen of the game application being executed by another user.

13. The cloud computing system of claim 1, wherein said at least one microprocessor is configured to accept information used to identify friend users from among users who are provided with the game applications associated with the thumbnail movies displayed in said table.

14. The cloud computing system of claim 1, further comprising an emulator configured to serve as a substitute for dedicated hardware needed to run said game applications.

15. An application provision method in a cloud computing system having a plurality of computational resources that are connected via a network, the method causing the computational resources of the cloud computing system to perform the steps of:

displaying, on a terminal used by a user using the cloud computing system, a table showing a list of selectable game applications for execution, said list of selectable game applications selected from among a plurality of game applications that can be executed on arbitrary dates and times by the user, the table assigning each of the selectable game applications to specified dates and times, such that each selectable game application is displayed in a particular date and time;

displaying a respective challenge icon in association with each selectable game application displayed in the particular date and time, each challenge icon operating, when selected by the user, to send a challenge to another user, relating to the playing of the associated game application, said challenged other user becoming an opponent upon accepting said challenge;

acquiring a user's selection from the table;

providing a game application, associated with the selection by the user, to the user;

displaying, for each of the listed game applications in the table, an indicator of the number of users who are different from the user provided with the game application and who are linked in advance to the user; and receiving an acceptance of the user's challenge from the other user, wherein the selected game application giving rise to said challenge is played asynchronously by said user and said opponent.

16. A non-transitory, computer readable storage medium containing a program for causing a cloud computing system having a plurality of computational resources that are connected via a network to implement provision of an application, the program causing the computational resources of the cloud computing system to implement the functions of:

displaying, on a terminal used by a user using the cloud computing system, a table showing a list of selectable game applications for execution, said list of selectable game applications can be executed on arbitrary dates and times by the user, the table assigning each of the selectable game applications to specified dates and times, such that each selectable game application is displayed in a particular date and time;

displaying a respective challenge icon in association with each selectable game application displayed in the particular date and time, each challenge icon operating, when selected by the user, to send a challenge to another user, relating to the playing of the associated game application, said challenged other user becoming an opponent upon accepting said challenge;

acquiring a user's selection from the table;

providing a game application, associated with the selection by the user, to the user;

displaying, for each of the listed game applications in the table, an indicator of the number of users who are different from the user provided with the game application and who are linked in advance to the user; and receiving an acceptance of the user's challenge from the other user, wherein the selected game application giving rise to said challenge is played asynchronously by said user and said opponent.

* * * * *